Nov. 24, 1925.

S. W. JOHNSON ET AL 1,562,967

HAND BRAKE

Filed June 11, 1925     2 Sheets-Sheet 1

Inventors
Sigurd Wilhelm Johnson
Andrew Ross
By their Attorneys

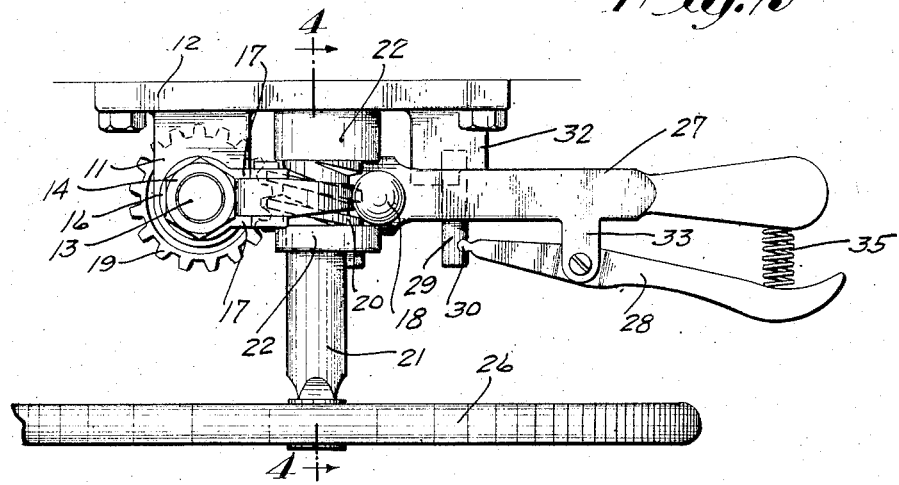
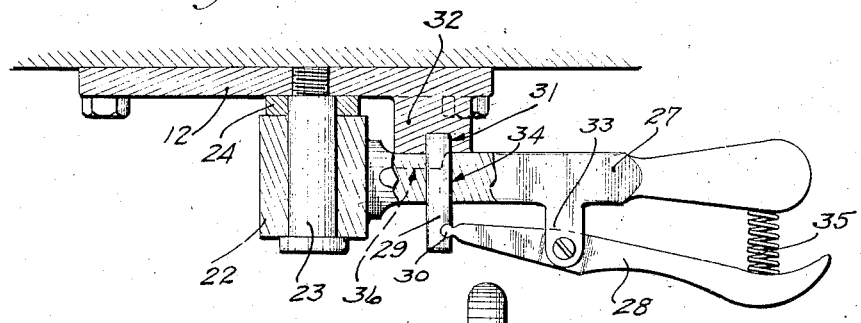
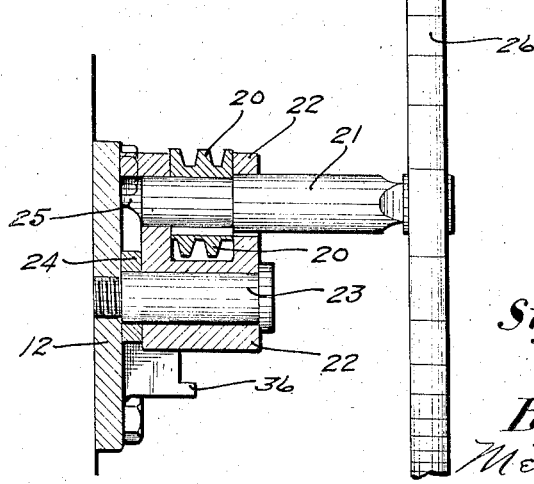

Patented Nov. 24, 1925.

1,562,967

UNITED STATES PATENT OFFICE.

SIGURD WILHELM JOHNSON, OF MINNEAPOLIS, AND ANDREW ROSS, OF ST. PAUL, MINNESOTA.

HAND BRAKE.

Application filed June 11, 1925. Serial No. 36,381.

*To all whom it may concern:*

Be it known that we, SIGURD WILHELM JOHNSON and ANDREW ROSS, citizens of the United States, residing at Minneapolis and St. Paul, respectively, in the counties of Hennepin and Ramsey and State of Minnesota, have invented certain new and useful Improvements in Hand Brakes; and we do hereby declare the following to be a full, clear, and exact description of the invention, such as will enable others skilled in the art to which it appertains to make and use the same.

Our invention relates to improvements in a hand brake intended for use on all kinds of cars, and has for certain of its objects to provide such a brake that is extremely simple, highly efficient, self-locking without the use of dogs, pawls or the like, and that may be instantly released with the resulting action that the hand wheel or other means for operating the brake is rendered inoperative and hence will not move or spin. Said invention further provides other important features, as will hereafter appear, and which relate to the simplicity of the mechanism, safety with which it may be operated, the elimination of chatter or rattle, and the setting of the brake at any desired tension.

To the above end, generally stated, the invention consists of the novel devices and combinations of devices hereinafter described and defined in the claims.

In the accompanying drawings, which illustrate the invention, like characters indicate like parts throughout the several views:

Referring to the drawings:

Fig. 2 is a top view of the parts shown in Fig. 1;

Fig. 3 is a detail view principally in horizontal section, taken on the line 3—3 of Fig. 1; and Fig. 4 is a detail view principally in vertical section taken on the line 4—4 of Fig. 2.

Figure 1:
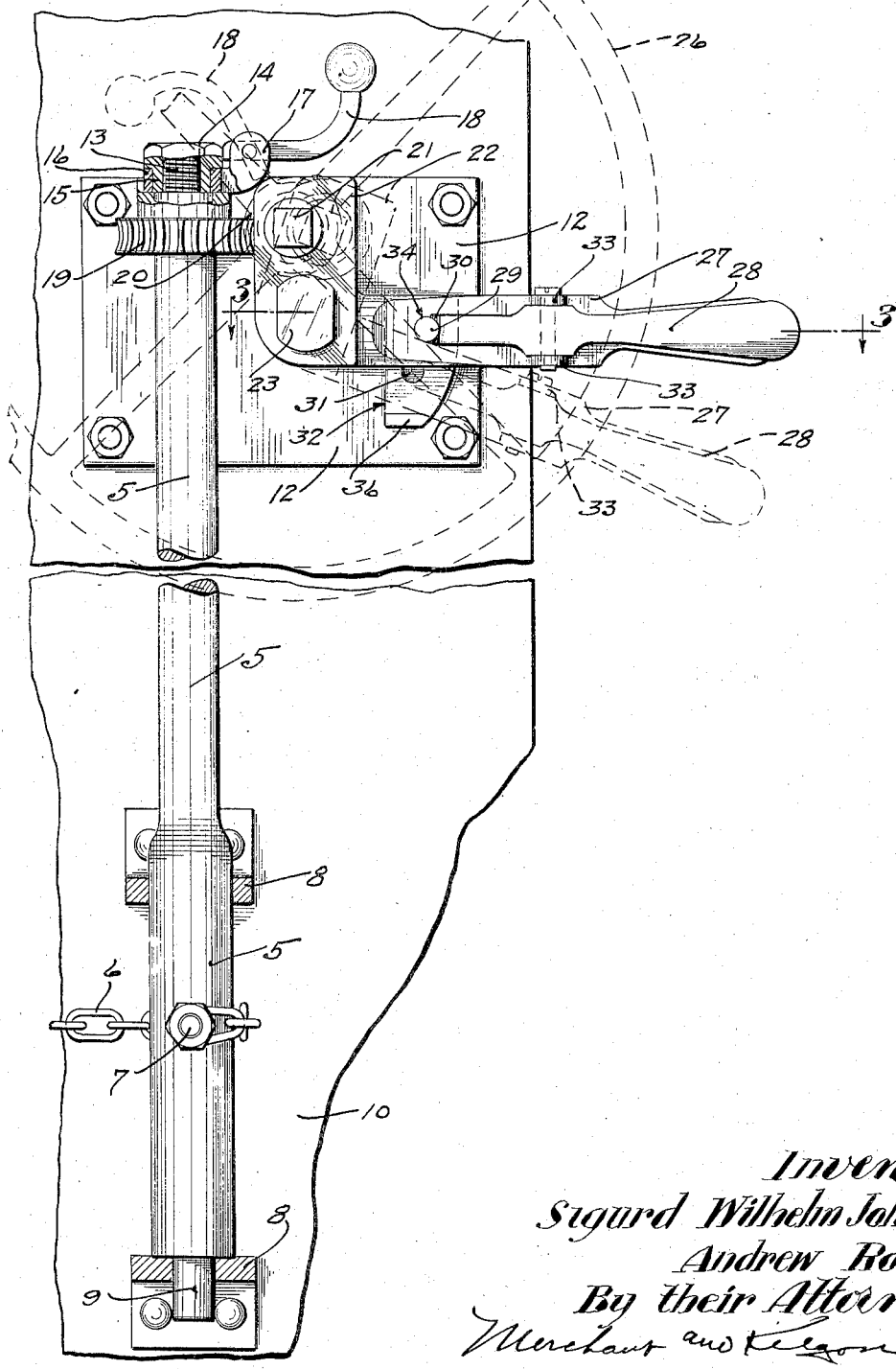
Fig. 1 is a fragmentary elevation of the improved hand brake, some parts indicated by broken lines, and other parts indicated in different positions by means of broken lines.

The numeral 5 indicates a standard brake staff, and the numeral 6 indicates a brake chain secured by a bolt 7 to the drum-like lower portion of said staff on which said chain may be wound by rotating the brake staff 5 during the brake-setting action. The lower end of the brake staff 5 rests on the lower portion of a bearing bracket 8 and has a depending reduced trunnion 9 journaled in a bore-like seat in said bracket. The upper end of the drum-like staff 5 is journaled in the upper portion of the bearing bracket 8. This bearing bracket 8 is secured to what may be assumed to be the body or other member of a car 10.

The upper end of the brake staff 5 is journaled in a bearing lug 11 on an anchor plate 12 bolted to the car 10. Formed with the upper end of the brake staff 5 is a reduced screw-threaded stud 13. The upper end of the brake staff 5 terminates at the upper face of the bearing lug 11, and the stud 13 extends thereabove and has applied thereto a hexagon nut 14, the flat sides of which afford stop shoulders for a purpose which will presently appear. This hexagon nut 14 has a reduced depending cylindrical portion 15 which impinges against the upper end of the brake staff 5 and has applied thereto a swivel 16 in the form of a collar having a bifurcated bearing lug 17 to which a hand crank 18 is pivoted for vertical swinging movement from a position in which it stands radially outward from the brake staff 5 to a position in which it extends radially inward over the hexagon nut 14, as indicated by broken lines in Fig. 1. The inner end of the hand crank 18, which is relatively wide, extends inward of its pivotal connection with the swivel 16 for engagement with any one of the sides of the hexagon nut 14 to lock the swivel 16 and hence said hand crank for common rotation with the brake staff 5, as indicated by full lines in Fig 1. The engagement of the hand crank 18 with the hexagon nut 14 forms a stop to limit the downward swinging movement of said hand crank and holds the same in an operative position. The purpose of this hand crank 18 is to rotate the brake staff 5, when the worm 20 is out of mesh with the worm gear 19, and wind the brake chain 6 thereon to take up the initial slack therein. Normally, the hand crank 18 is turned over the hexagon nut 14, as indicated by broken lines in Fig. 1, which disconnects the same from the hexagon nut 14 and permits free rotation of the brake staff 5 in respect to the hand crank 18, and hence prevents spinning thereof.

Keyed to the brake staff 5, just below the bearing lug 11, is a worm gear 19 with which meshes a worm 20 keyed to the inner end portion of a short shaft 21, journaled in the prongs of an upstanding bifurcated crank 22. The worm 20 is mounted between the prongs of the crank 22 and is held thereby against axial movement. Said crank 22 at its lower end is pivoted on a headed shouldered stud 23 secured to the anchor plate 12 by screw-threaded engagement. A spacing collar 24 is mounted on the stud 23 and interposed between the anchor plate 12 and crank 22. The crank 22 is held between the head of the pivot stud 23 and spacing collar 24 with such freedom as to permit free swinging movement of the crank 22. Formed with the inner prong of the crank 22 at the free end thereof is a lug 25 which engages the anchor plate 12 as a thrust bearing to take the strain from the pivot stud 23 during the brake-setting action and while the brakes are set. Keyed to the outer end of the shaft 21 is a hand wheel 26 by which the shaft 21 may be operated to rotate the brake staff 5 through the worm 20 and worm gear 19. Integrally formed with the pivoted end of the crank 22, in bell crank arrangement therewith, is a hand lever 27 which extends radially away from the brake staff 5 for operating said crank to carry the worm 20 into and out of mesh with the worm gear 19.

To lock the hand crank 27 with the worm 20 either in mesh or out of mesh with the worm gear 19, we provide a latch comprising a lever 28 and a thrust bolt 29 to which it is connected by a joint 30. This thrust bolt 29 is arranged to enter either one of a pair of circumferentially spaced bore-like seats 31 in a latch lug 32 integrally formed with the anchor plate 12. The latch lever 28 is intermediately fulcrumed to a bifurcated bearing lug 33 integrally formed with the hand lever 27. The thrust bolt 29 is mounted in a transverse seat 34 which extends completely through the hand lever 27. A coiled spring 35, interposed between the latch lever 28 and the hand lever 27, is under strain to project the thrust bolt 29 into either of the seats 31 when brought into alignment therewith. A stop finger 36 on the lower end of the latch lug 32 limits the downward movement of the operating lever 27 and positions the thrust bolt 29 for entrance in the lower seat 31 to lock the operating lever 27 with the worm 20 out of mesh with the worm gear 19.

In actual usage, a casing substantially the same size as the anchor plate 12 will be provided to cover all of the parts thereon and with only a slot therein for the hand lever 27 to permit the required movement to carry the worm 20 into and out of mesh with the worm gear 19. Said casing will also be provided with an aperture to permit the free rotation of the swivel 16 with the hand crank 18 working above said casing.

Operation.

When the brakes are set, the hand crank 18 will be in an inoperative position, as shown by broken lines in Fig. 1, so that the swivel 16 is loose in respect to the brake staff 5. Obviously, the hand wheel 26 is in a convenient position for an operator so that the brakes can be set with comparatively little effort. The worm 20 and worm gear 19 permit any desired tension to be placed on the brake chain 6 which is not possible with the hand brakes in which pawl and ratchet devices are used for the reason that the brake staff must always be moved a predetermined distance to permit the pawl to engage one of the teeth of the ratchet wheel. Furthermore, the worm 20 and worm gear 19 automatically and positively lock the brake staff 5 against backward rotation under the tension of the brake chain 6 thereon, and there is no danger whatsoever in the accidental release of the brake staff 5 by a movement of the worm 20 out of mesh with the worm gear 19. When the brakes are set, the end thrust on the worm 20 by the worm gear 19 is taken by the anchor plate 12 through the adjacent prong of a bifurcated crank 22 thus relieving all strain on the pivotal support of said crank.

To release the brakes, it is only necessary for the operator to take hold of the hand lever 27, together with the latch lever 28, and press said latch lever against the tension of the spring 35 to withdraw the thrust bolt 29 from the upper bolt seat 31, and then swing the hand lever 27 downward against the stop 36 to move the worm 20 out of mesh with the worm gear 19, release the brake staff 5 and permit the same to be freely rotated under the tension of the brake chain 6 as the same unwinds therefrom. At the time the hand lever 27 engages the stop 36, the operator releases the latch lever 28 and permits the thrust bolt 29 to enter the lower seat 31 and thereby lock the hand lever 27 with the worm 20 out of mesh with the worm gear 19.

The instant that the worm 20 is moved out of mesh with the worm gear 19, the hand wheel 26 is rendered inoperative so that the same is at rest and will not spin during the brake releasing action. When the operator is releasing the brakes, he has a good hold on the hand lever 27 and may also hold onto the hand wheel 26 so that there is no danger of him being thrown from his position or in any way injured by the moving parts of the brake releasing mechanism. At the time the thrust bolt 29 is withdrawn from the upper seat 31, the outward pressure of the worm gear 19 on the worm 20 assists in moving said worm out of mesh with the worm gear.

To take up the initial slack in the brake chain 6 after the brake has been released, the hand crank 18 may be turned into an operative position, as indicated by full lines in Fig. 1, to cause the inner end thereof to engage one of the flat sides of the hexagon nut 14 and thereby lock the swivel 16 for common rotation with the brake staff 5. The brake staff 5 can then be rotated by the hand crank 18. When this initial slack in the brake chain 6 is taken up, the hand lever 27 is operated to carry the worm 20 into mesh with the worm gear 19 and thereby lock the brake staff against a movement to permit the brake chain to unwind therefrom. The hand crank 18 is then turned into an inoperative position so that the same will not spin at the time the brake staff 5 is released by the movement of the worm 20 out of mesh with the worm gear 19. In some instances, this hand crank 18 may be dispensed with and the initial slack taken up in the brake chain 6 by operating the hand wheel 26.

To move a car, when the brakes are set, to reposition the same, it is only necessary to turn the hand wheel 26 backward to release the brake chain 6. By thus releasing the brakes, it is not necessary to detach the worm 20 from the worm gear 19 so that the brakes are always operative to control the movement of the car.

What we claim is:

1. In a hand brake, a brake staff equipped with a worm gear, a crank mounted for free swinging movement in a vertical plane, a worm journaled on the crank and adapted to mesh with the worm gear, a hand lever directly attached to the crank, arranged to drop under the action of gravity and swing the crank into a position to carry the worm out of mesh with the worm gear, a latch for holding the hand lever with the worm in mesh with the worm gear, and means for operating the worm.

2. In a hand brake, a brake staff equipped with a worm gear, a crank, a worm mounted on the crank, means for moving the crank to carry the worm into and out of mesh with the worm gear, means for operating the worm, and a hand crank applied to the brake staff for turning the same when the worm is out of mesh with the worm gear.

3. The structure defined in claim 2 in which the hand crank is pivotally applied to the brake staff.

4. In a hand brake, a brake staff equipped with a worm gear, a crank, a worm mounted on the crank, means for moving the crank to carry the worm into and out of mesh with the worm gear, means for operating the worm, a swivel on the brake staff, and a hand crank pivoted to the swivel and arranged to engage a shoulder on the brake staff when in an operative position to lock the swivel to the brake staff for common rotation therewith.

5. In a hand brake, a brake staff equipped with a worm gear, a crank, a worm mounted on the crank, means for moving the crank to carry the worm into and out of mesh with the worm gear, means for operating the worm, a shouldered nut applied to the brake staff and having a cylindrical body portion, a swivel on the cylindrical body portion of the nut, and a hand crank pivoted to the swivel and adapted in one of its positions to engage the shouldered nut and lock the swivel to the brake staff for common rotation therewith.

In testimony whereof we affix our signatures.

SIGURD WILHELM JOHNSON.
ANDREW ROSS.